United States Patent Office 3,133,001
Patented May 12, 1964

3,133,001
STABILIZATION OF ENZYMES
Pedro Puig Muset, J. Verdaguer 161,
Molins de Rey, Spain
No Drawing. Filed Nov. 28, 1960, Ser. No. 71,875
Claims priority, application Spain Nov. 26, 1959
8 Claims. (Cl. 195—68)

The present invention relates to the stabilization of enzymes, and more particularly to the production of stabilized enzymes such as catalase which are normally sensitive and unstable and which ordinarily rapidly lose potency and activity when stored.

It is well known that enzymes such as catalase (both hepatocatalase and hematocatalase) deteriorate quite rapidly when stored at room temperature, even when stored in sealed containers, and even when stored in solid condition. Solutions of these enzymes spoil within several hours even under refrigeration, while solid, crystallized enzymes lose their activity after a few days of storage when stored under refrigeration.

It is also known that freshly prepared solutions of pure, crystalline catalase, or of aldolase or of 17-hydroxy steroid dehydrogenase when subjected to lyophilization (freeze-drying) under the most carefully controlled conditions lose up to 50% of their activity.

Thus, prior to the present invention, due to the extraordinary sensitivity and lack of keeping properties of these enzymes it was impossible to make commercial use of the same. When it is attempted to use these enzymes for therapeutic purposes the unavoidable delay between the time that the ampoules or vials are filled and the time of use thereof by the physician results in complete loss of activity of the enzymes so that the same cannot be used in this manner.

It is accordingly a primary object of the present invention to provide for the production of enzymes which are stable and remain stable over prolonged periods of storage without loss of activity, thereof.

It is another object of the present invention to provide for the production of stabilized enzymes such as catalase, aldolase and 17-hydroxy dehydrogenase which can be stored in sealed containers even at room temperature for many many months without any loss of activity whatsoever.

It is yet another object of the present invention to provide a new method of producing stabilized enzymes of the above type which method results in the direction production of the enzymes in highly stable and protected form.

It is still a further object of the present invention to provide a new method of utilizing lyophilization as a means of producing stabilized enzymes which could not be produced in stable form prior to the present invention.

Other objects and advantages of the present invention will be apparent from a further reading of the specification and of the appended claims.

With the above objects in view, the present invention mainly comprises the production of stabilized enzymes by subjecting a solution of the enzyme and a disaccharide to lyophilization. This results in the production of a dry enzyme coated with and protected by the molecules of the disaccharide, the enzyme in this form being storable for prolonged periods of time without loss of activity.

The present invention is in general applicable to sensitive enzymes such as catalase, aldolase and 17-hydroxy dehydrogenase. It is particularly applicable and directed to the production of stabilized catalase (either hepatocatalase or hematocatalase).

The most suitable disaccharides may be used in the solution, e.g. the aqueous solution of the enzyme are the common disaccharides such as sucrose, lactose and maltose.

The lyophilization is carried out at commonly used temperatures for such freeze-drying, e.g. between —40° C. and 0° C., with the most preferred temperature for the lyophilization being at about —5° C.

The concentration of the enzyme in the aqueous solution may vary within wide limits and preferably maintained at about between 0.5% and 5%, most preferably at about 3% by weight. The concentration of the disaccharide in the aqueous solution may likewise vary within wide limits but is preferably maintained at between about 10% and 35%, and most preferably at about 25% by weight. In order to prevent deleterious action on the enzyme the pH of the solution should be maintained preferably at between about 6.5 and 7.5, and most preferably at about 6.9.

It has been discovered that if a solution of pure, crystallized catalase or another sensitive enzyme mixed with a solution, preferably a concentrated solution of a disaccharide such as sucrose, lactose or maltose, is subject to lyophilization, the resulting dried enzyme is obtained with no loss of enzymatic activity and the thus obtained lyophilized product can be stored indefinitely with no apparent loss of its original activity.

It has been verified from samples of hepatocatalase and hematocatalase obtained by lyophilization of a common solution of the crystallized enzyme and sucrose that the catalase retains its activity unimpaired after twelve months of storage at room temperature in sealed containers. This fact was verified by spectrophotometric methods as well as by other procedures commonly used to establish the activity of catalase. Similar assays with other enzymes produced analogous results.

It is advisable in storing the lyophilized enzymes such as the catalase produced in accordance with the method of the present invention not to contact the enzyme with the glass because of the well known sensitivity of enzymes such as catalase in contact with glass. Accordingly, the vials used in the lyophilization of solution and in the storage of the product are preferably coated on the inner surface thereof with silicone.

The method of the present invention wherein an enzyme solution containing a large amount of disaccharide is subjected to lyophilization results in the production of an enzymatic preparation in which the molecules of the enzyme are coated and protected from outside influences by the molecules of the disaccharide which have the effect of preserving the stability or activity of the enzyme.

The following example is given to further illustrate the present invention. The scope of the invention is not, however, meant to be limited to the specific details of the example.

*Example*

100 cc. of a 50% weight by volume sucrose solution are added to a solution of 10 mg. of crysallized hepatocatalase in 100 cc. of a 0.9% aqueous sodium chloride solution. The mixing is carried out under cooling using previously cooled solutions maintained at a temperature below 5° C.

The resulting liquid is then forced through a sterilizing membrane, and aseptically distributed into several vials (previously coated on the inner surface with silicone and sterilized). Into each container is introduced the volume of solution required according to the quantity of hepatocatalase which is to remain in the container.

The contents of the vials are then quickly frozen and kept for a short time at a temperature below —30° C. The frozen liquids are finally lyophilized using normal lyophilization techniques under aseptic conditions. The vials are then hermetically sealed, capped and labelled.

In order to convert the solid in the vial into a solution for injection purposes a 0.05 molar phosphate buffer at pH of 7.0 is used as the solvent since this does not inactivate the catalase.

In the above method it is possible to use either lactose or maltose as the disaccharide with exactly the same results, and the same results are achieved using other sensitive enzymes such as aldolase and 17-hydroxy steroid dehydrogenase.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of stabilizing enzymes, which comprises subjecting a solution of an enzyme selected from the group consisting of catalase, aldolase and 17-hydroxy dehydrogenase and a disaccharide to lyophilization, thereby obtaining a stabilized enzyme which may be stored for prolonged periods of time without loss of activity.

2. Method of stabilizing enzymes, which comprises subjecting a solution of an enzyme selected from the group consisting of catalase, aldolase and 17-hydroxy dehydrogenase and a disaccharide selected from the group consisting of sucrose, lactose and maltose to lyophilization, thereby obtaining a stabilized enzyme which may be stored for prolonged periods of time without loss of activity.

3. Method of stabilizing enzymes, which comprises subjecting a solution of an enzyme selected from the group consisting of catalase, aldolase and 17-hydroxy dehydrogenase and a disaccharide selected from the group consisting of sucrose, lactose and maltose to lyophilization at a temperature about −40° C. and 0° C., thereby obtaining a stabilized enzyme which may be stored for prolonged periods of time without loss of activity.

4. Method of stabilizing enzymes, which comprises subjecting an aqueous solution containing about 0.5–5% of an enzyme selected from the group consisting of catalase, aldolase and 17-hydroxy dehydrogenase and between about 10–35% of a disaccharide to lyophilization, thereby obtaining a stabilized enzyme which may be stored for prolonged periods of time without loss of activity.

5. Method of stabilizing enzymes, which comprises subjecting an aqueous solution containing about 0.5–5% of an enzyme selected from the group consisting of catalase, aldolase and 17-hydroxy dehydrogenase and between about 10–35% of a disaccharide selected from the group consisting of sucrose, lactose and maltose to lyophilization, thereby obtaining a stabilized enzyme which may be stored for prolonged periods of time without loss of activity.

6. Method of stabilizing enzymes, which comprises subjecting an aqueous solution containing about 0.5–5% of an enzyme selected from the group consisting of catalase, aldolase and 17-hydroxy dehydrogenase and between about 10–35% of a disaccharide selected from the group consisting of sucrose, lactose and maltose and having a pH between about 6.5 and 7.5 to lyophilization at a temperature between about −40° C. and 0° C., thereby obtaining a stabilized enzyme which may be stored for prolonged periods of time without loss of activity.

7. Method of stabilizing catalase, which comprises subjecting a solution of catalase and a disaccharide to lyophilization, thereby obtaining a stabilized catalase which may be stored for prolonged periods of time without loss of activity.

8. Method of stabilizing catalase, which comprises subjecting a solution of catalase and a disaccharide selected from the group consisting of sucrose, lactose and maltose to lyophilization, thereby obtaining a stabilized catalase which may be stored for prolonged periods of time without loss of activity.

References Cited in the file of this patent

UNITED STATES PATENTS

| | | |
|---|---|---|
| 1,855,591 | Wallerstein | Apr. 26, 1932 |
| 2,703,779 | Lolli et al. | Mar. 8, 1955 |
| 2,826,503 | Roberts et al. | Mar. 11, 1958 |
| 2,922,749 | Snyder et al. | Jan. 26, 1960 |
| 3,006,815 | Scott | Oct. 31, 1961 |

OTHER REFERENCES

Manual of Microbiological Methods, 1957, pages 101–104, McGraw Hill, New York, QR 65 S6, 1957.

Journal of Bacteriology, vol. 73, pages 394–397, 1957, The Williams & Wilkins Co., Baltimore, Md.

Methods in Enzymology, vol. I, page 54, 1955, Academic Press, New York, QP 601 C72.